(12) United States Patent
Kurata

(10) Patent No.: US 7,413,203 B2
(45) Date of Patent: Aug. 19, 2008

(54) SUSPENSION SYSTEM FOR ELECTRIC VEHICLE

(75) Inventor: Fumito Kurata, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 243 days.

(21) Appl. No.: 10/554,092

(22) PCT Filed: May 12, 2004

(86) PCT No.: PCT/JP2004/006707

§ 371 (c)(1),
(2), (4) Date: Oct. 21, 2005

(87) PCT Pub. No.: WO2004/101304

PCT Pub. Date: Nov. 25, 2004

(65) Prior Publication Data

US 2006/0225931 A1    Oct. 12, 2006

(30) Foreign Application Priority Data

May 14, 2003  (JP)  .............................. 2003-135924
May 15, 2003  (JP)  .............................. 2003-137453

(51) Int. Cl.
*B60G 9/00*    (2006.01)
(52) U.S. Cl. .............................. 280/124.156; 180/65.5; 280/124.146; 280/124.159
(58) Field of Classification Search .............. 280/124.1, 280/124.17, 124.146, 124.156, 124.158, 280/124.159, 124.161, 124.171, 5.51, 5.508; 180/65.1, 65.5, 300
See application file for complete search history.

(56) References Cited

U.S. PATENT DOCUMENTS

| | | | | |
|---|---|---|---|---|
| 5,087,229 A | * | 2/1992 | Hewko et al. | ................ 475/149 |
| 5,577,771 A | * | 11/1996 | Lee | ............................ 280/5.52 |
| 5,679,087 A | | 10/1997 | Lutz | |
| 5,848,663 A | | 12/1998 | Kuriki | |

FOREIGN PATENT DOCUMENTS

| | | |
|---|---|---|
| DE | 37 25 620 A1 | 2/1989 |
| EP | 0 544 597 A1 | 6/1993 |
| GB | 156398 | 1/1921 |
| JP | A-61-122019 | 6/1986 |
| JP | A 62-227813 | 10/1987 |
| JP | A 11-170831 | 6/1999 |
| JP | A 2000-16040 | 1/2000 |
| JP | A 2000-335386 | 12/2000 |
| JP | A 2001-315534 | 11/2001 |
| WO | WO 02/083446 A1 | 10/2002 |

* cited by examiner

*Primary Examiner*—Christopher Ellis
*Assistant Examiner*—Robert A. Coker
(74) *Attorney, Agent, or Firm*—Oliff & Berridge, PLC

(57) ABSTRACT

A suspension system (10) for a vehicle for suspending a wheel (1) is disclosed. The suspension system (10) includes a motor (12) for driving the wheel of the vehicle; a first suspension (22) for supporting the wheel (1) of the vehicle with respect to the vehicle body; a second suspension (30) for elastically supporting the motor (12) with respect to the vehicle body; and a power transferring mechanism (14) for transferring power from the motor (12) to the wheel (1) while permitting relative movement of the motor (12) with respect to the wheel (1).

7 Claims, 8 Drawing Sheets

FIG.3A  FIG.3B  FIG.3C
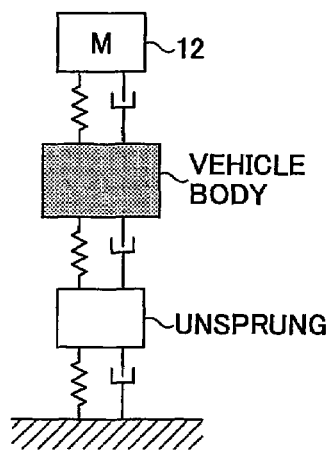
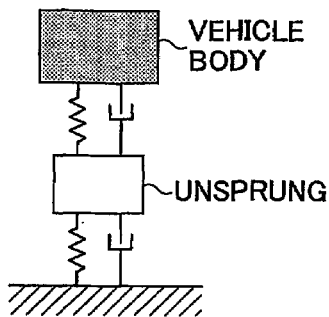
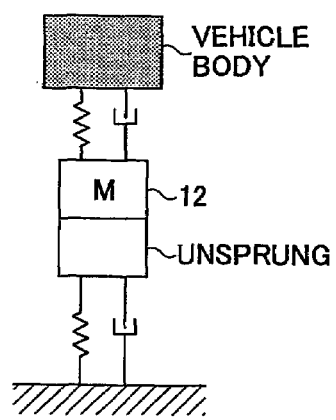
FIG.4
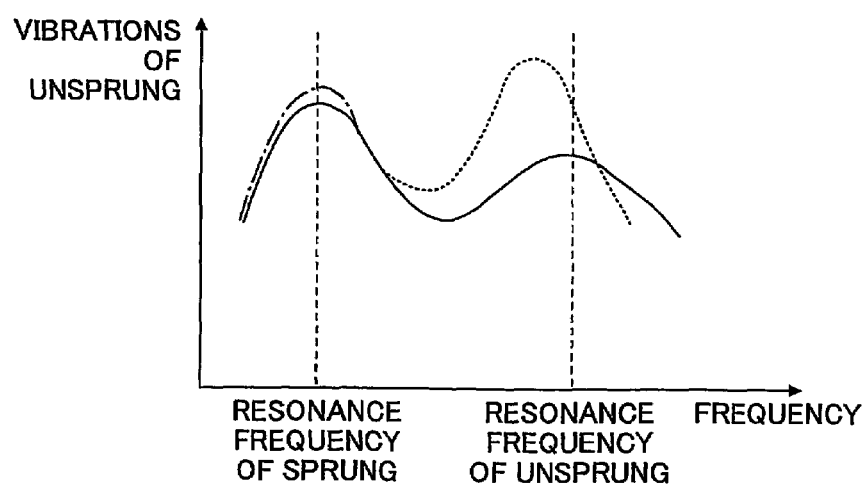

SUSPENSION SYSTEM FOR ELECTRIC VEHICLE

TECHNICAL FIELD

The present invention relates to a suspension system for a vehicle that utilizes the power of motors for driving wheels.

BACKGROUND ART

JP2000-16040 A discloses a suspension system for use in a vehicle, wherein a motor for driving the wheel is provided inside the wheel. With this arrangement, thanks to arranging the motor within the wheel, it is possible to make advantageous use of space within the wheel as well as to reduce the weight of a mechanism for transferring the driving power generated from the motor to the wheel.

In this conventional suspension system, since the motor is directly connected to the wheel, an unsprung mass increases by the amount of the motor and components associated therewith, resulting in a deterioration in a road holding characteristic and thus ride quality.

DISCLOSURE OF INVENTION

Therefore, it is an object of the present invention to improve ride quality of a vehicle that utilizes power of a motor for driving a wheel.

In order to achieve the above-mentioned objects, according to one aspect of the present invention a suspension system for a vehicle is provided, comprising: a motor for driving a wheel of the vehicle; a first suspension for supporting the wheel of the vehicle with respect to a vehicle body; a second suspension for elastically supporting the motor with respect to the vehicle body; and a power transferring mechanism for transferring power from the motor to the wheel while permitting relative movement of the motor with respect to the wheel.

According to this aspect of the present invention, the motor is not rigidly supported with respect to the wheel or rigidly supported with respect to the vehicle body but is elastically supported with respect to the vehicle body by the second suspension. Since the motor and the wheel are supported independently by the first and second suspensions, respectively, with respect to the vehicle body, an unsprung mass is reduced, resulting in improvement in a road holding characteristic.

In a particular embodiment, the second suspension includes a spring element and a damper element. With this embodiment, it is possible to give particular suspension characteristics suited for the motor and the wheel to the suspensions for the motor and the wheel, respectively. In other words, it is possible to tune the respective characteristics (spring/damper property) of the first and second suspensions independently.

In a particular embodiment, a damper element of the first suspension and the damper element of the second suspension are interconnected via a fluid passage such that the motor and the wheel move in opposite phases. With this embodiment, when the wheel bounds or rebounds, the wheel and the motor are forced to move in opposite directions (in opposite phases), whereby a vibration-damping effect can be attained. It is noted that through the fluid passage is circulated a fluid (gas, oil, etc.) filling a fluid cylinder.

In another particular embodiment, the damper elements of the second suspensions on both sides (i.e. left side and right side) of the vehicle are interconnected via a fluid passage. With this embodiment, it is possible to limit the movements of the motors on the both sides of the vehicle to an in-phase mode or an opposite-phase mode. For example, in case of limiting the movements to an in-phase mode, since the movements of the motors in up-and-down directions are permitted only when the unsprung components on both sides of the vehicle vibrates in phase, it is possible to prevent sprung mass from being urged in a roll direction due to reaction forces of the motors.

According to another aspect of the present invention a suspension system for a vehicle is provided, comprising: a motor for driving a wheel of the vehicle; a first suspension for supporting the motor with respect to a vehicle body such that the motor can move in up-and-down directions with respect to the vehicle body; a second suspension for supporting the wheel with respect to the motor such that the wheel can move in up-and-down directions with respect the motor; and a power transferring mechanism for transferring power from the motor to the wheel while permitting relative movement of the motor with respect to the wheel.

According to this aspect of the present invention, since the motor and the wheel are dependently supported by the first and the second suspensions, respectively, a road holding characteristic is improved with respect to an arrangement in which the motor and the wheel are interconnected rigidly and supported by a suspension simultaneously.

In a particular embodiment, the first suspension includes a spring element and a damper element and the second suspension includes a spring element and a damper element. With this embodiment, it is possible to give particular suspension characteristics suited for the motor and the wheel to the suspensions for the motor and the wheel, respectively. In other words, it is possible to tune the respective characteristics (spring/damper property) of the first and second suspensions independently.

In another particular embodiment, the first suspension includes a leaf spring. With this embodiment, it is possible to simplify the second suspension.

Other objects, features and advantages of the present invention will become more apparent from the following detailed description when read in conjunction with the accompanying drawings.

BRIEF DESCRIPTION OF THE DRAWINGS

FIG. 3A is a diagram for illustrating a spring-mass model of the suspension system 10 according to the present invention.

FIGS. 3B and 3C are diagrams for illustrating traditional spring-mass models for comparison purposes.

FIG. 4 is a graph showing performances of the spring-mass models illustrated in FIGS. 3A-3C.

BEST MODE FOR CARRYING OUT THE INVENTION

Hereafter, the preferred embodiments according to the present invention are explained with reference to the drawings.

Figure 1:
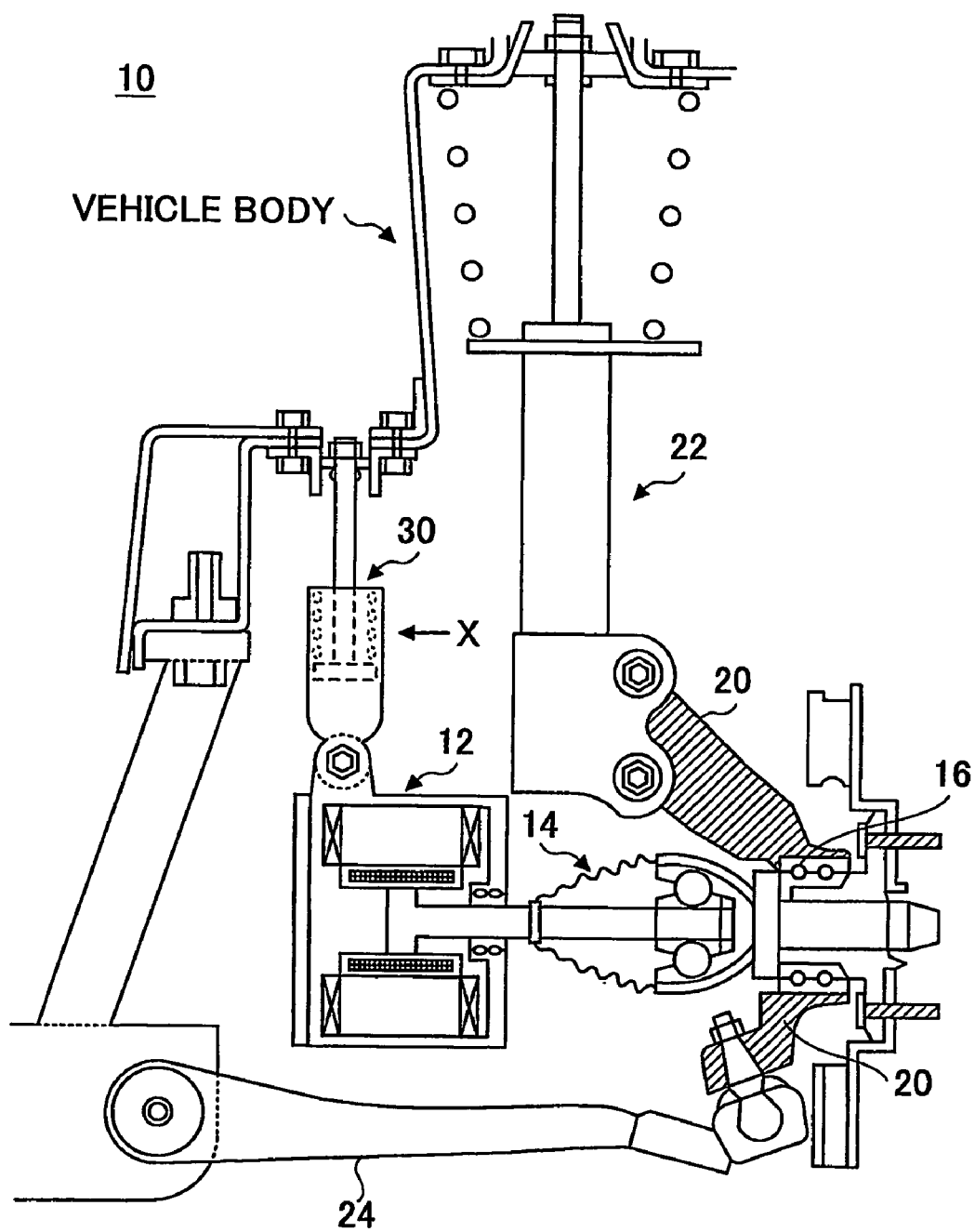
FIG. 1 is a schematic front view of a first embodiment of a suspension system according to the present invention.

FIG. 1 is a schematic front view of a first embodiment of a suspension system according to the present invention. The suspension system 10 according to this embodiment has a motor 12 for driving a wheel. Every driven wheel is provided with one of the motors 12 and a braking system (e.g., a caliper and a disk rotor) shown in part. A steering system (e.g., a tie rod) is provided for steering the wheel. Explanation is made below for only one driven wheel, since there is substantially no difference in arrangement between the wheels. However, it is noted that the arrangement according to this embodiment may be applied to only front wheels or only rear wheels.

A rotating shaft of the motor 12 is connected to the driven wheel via a drive shaft (including a constant velocity joint) 14 that passes through a knuckle (steering knuckle) 20. The drive shaft 14 is rotatably supported inside the knuckle 20 by way of a bearing 16. To the knuckle 20 is coupled a lower end of a suspension 22 which mainly includes a coil spring and a shock absorber. An upper end of the suspension 22 is connected to a vehicle body. To the knuckle 20 is also coupled one end of a lower arm 24 via a ball joint. The other end of lower arm 24 is pivotally mounted to the vehicle body. In this way, the driven wheel is supported by the vehicle body such that it can move mainly in up-and-down directions with respect to the vehicle body via the suspension 22.

Figure 2:
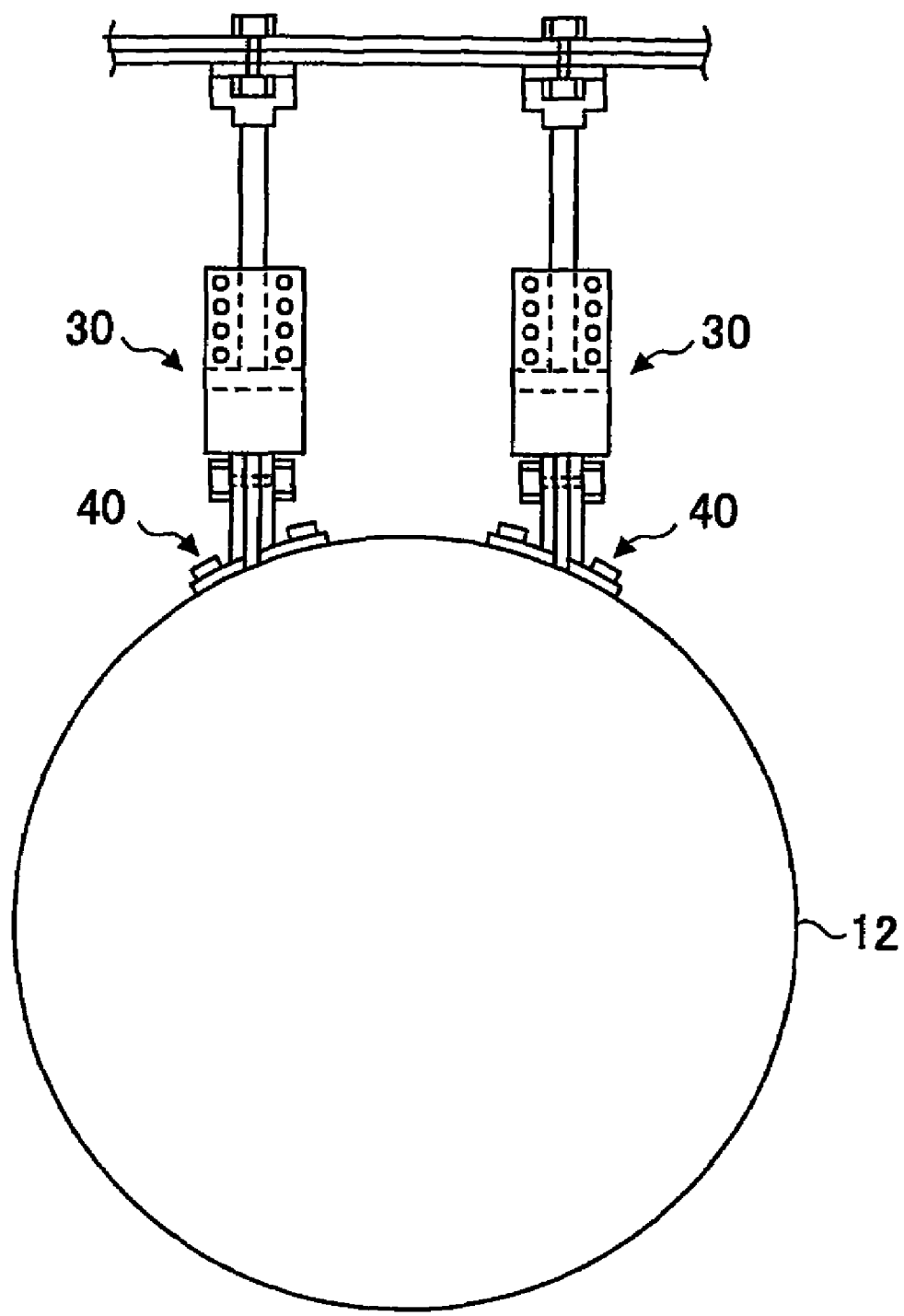
FIG. 2 is a view of a support mechanism for a motor 12 as seen from a direction X of FIG. 1.

FIG. 2 is a view of a support mechanism for the motor 12, as seen from a direction X of FIG. 1. The motor 12 according to this embodiment is supported by the vehicle body via a suspension 30 such that it can move mainly in up-and-down directions with respect to the vehicle body, as shown in FIG. 1. The suspension 30 illustrated in FIG. 1 includes a shock absorber and a coil spring integrated therewith. Preferably, the motor 12 is supported by way of two suspensions 30, which are arranged in parallel, so as not to be rotated when a rotating counterforce is applied thereto, as shown in FIG. 2. Typically, the two suspensions 30 have the same spring and shock-absorbing characteristics. In this case, the two suspensions 30 are disposed along the circumference of the motor 12 and coupled to the motor 12 (an outer casing of motor 12) at the two points 40 set thereon. It is noted that the motor 12 is disposed as close to the driven wheel as possible in order to shorten the length and thus reduce the weight of the power transferring mechanism including a constant velocity joint and so on.

With this arrangement, the motor 12 is supported by the vehicle body such that it can move mainly in up-and-down directions with respect to the vehicle body via the suspensions 30. In this way, the motor 12 and the wheel shaft 18 have corresponding centers of gravity, which move in up-and-down directions independently from each other. Concerning this, the power transferring mechanism (constant velocity joint), which provides the coupling between the rotating shaft of the motor 12 and the wheel shaft 18, is configured to accommodate such relative movement between the motor 12 and the wheel shaft 18 as well as to transfer the rotating torque generated by the motor 12 to the wheel shaft 18.

It is noted that the present invention should not be limited by the aforementioned configuration for coupling the motor 12 to the wheel shaft 18 or the aforementioned configuration for suspending the driven wheel. Different configurations may be applicable as long as they provide the motor 12 and the driven wheel with such elastic supports with respect to the vehicle body, which enable the motor 12 and the driven wheel to move in up-and-down directions independently from each other while enabling the transfer of the driving power of the motor 12 to the wheel shaft 18. For example, the present invention can be applied to any type of suspension system other than the strut type suspension above-mentioned, such as a double wishbone type suspension and the like. Further, the motor 12 may be connected to the driven wheel via a flexible coupling.

FIG. 3A shows a spring-mass model of the suspension system 10 according to the present invention. FIG. 3B shows a comparative spring-mass model of the suspension system 10 where the motor 12 is rigidly coupled to the vehicle body. FIG. 3C shows another comparative spring-mass model of the suspension system 10 where the motor 12 is directly coupled to the wheel. FIG. 4 shows performance curves (acceleration in up-and-down directions versus frequency) of the respective spring-mass models in FIGS. 3A-3C compared under the same conditions (as to the mass of a component, a spring constant, etc.).

According to the present embodiment, as is apparent from the foregoing or FIGS. 3A-3C, since the motor 12 is connected to the vehicle body independently from the driven wheel, the unsprung mass is the same as that of the configuration shown in the FIG. 3B and smaller than that of the configuration shown in the FIG. 3C by the mass of the motor 12 (plus the masses of components associated with motor 12). Therefore, with the present embodiment, as indicated by a solid line in FIG. 4, a road holding characteristic at the resonance frequency of the unsprung mass is significantly improved with respect to the configuration (indicated by a break line in FIG. 4) shown in the FIG. 3C. Further, according to the present embodiment, since the motor 12 is supported by the vehicle body via the springs and the shock absorbers, a road holding characteristic at the resonance frequency of the sprung mass is also improved to a certain degree with respect to the configuration (indicated by alternate long and short dashed lines in FIG. 4) shown in the FIG. 3B.

Consequently, according to the present embodiment, since the motor 12 is not one of the unsprung components, the unsprung mass is reduced, which improves the road holding characteristic. Further, it is possible to tune suspension characteristics for the motor 12 and the driven wheel independently, because they are suspended independently with respect to the vehicle body. Further, since the motor 12 is supported by the vehicle body via the springs and the shock absorbers, it is possible to prevent the vibrations of the motor 12, which are vibrations generated by the rotating operation or by the driving over a bad road, from being transferred to the vehicle body It is noted that the suspension 22 for the driven wheel and/or the suspension 30 for the motor 12 may be constituted by a leaf spring instead of the spring and the shock absorber.

Figure 5:
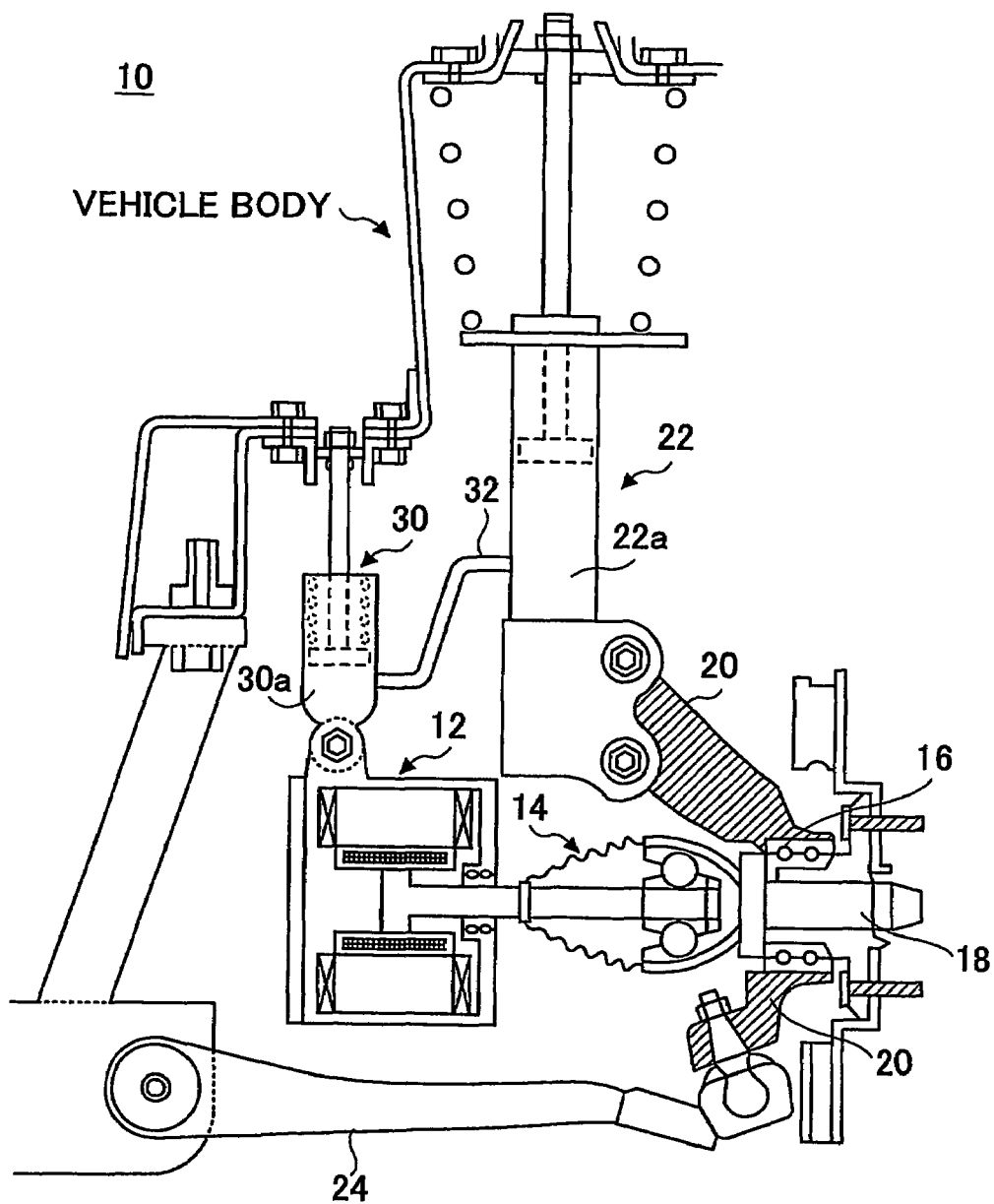
FIG. 5 is a schematic front view of a second embodiment of a suspension system according to the present invention.

Next, a second embodiment of a suspension system 10 according to the present invention is described with reference to FIG. 5. FIG. 5 is a schematic front view of a suspension system 10 according to the second embodiment. Explanation is made below for only one wheel, since there is substantially no difference in arrangement between the wheels. However, it is noted that the arrangement according to this embodiment may be applied to only front wheels or only rear wheels.

As shown in FIG. 5, the suspension system 10 according to the second embodiment differs from the suspension system 10 according to the first embodiment in that a fluid passage 32 (e.g., a pipe or tubing) connects an appropriate fluid chamber 22a of the shock absorber of the suspension 22 for the driven wheel, which may be one of 2 fluid chambers defined by a piston within a piston cylinder, to an appropriate fluid chamber 30a of the shock absorber of the suspension 30 for the motor 12. In this embodiment, the fluid passage 32 establishes fluid communication between the shock absorber of the suspension 22 and the shock absorber of the suspension 30 such that the two fluid chambers 22a and 30a displace (expand and contract) in opposite phases. Thus, when the driven wheel bounds, for instance, the fluid in the fluid chamber 22a on the driven wheel side is discharged into the fluid chamber 30a on the motor 12 side via the fluid passage 32, whereby the motor 12 moves in a downward direction (the direction in which the volume of the fluid chamber 30a increases). In this way, according to this embodiment, the motor 12 and the driven wheel are forced to move in opposite phases, by way of which a vibration-damping effect is attained.

It is noted that in the case of the two suspensions 30 being provided for each driven wheel as abovementioned, two fluid chambers 30a of the respective suspensions 30 may be independently connected to the fluid chamber 22a via two fluid passages 32. Alternatively, two fluid chambers of the respective suspensions 30 may be connected to each other via a separate fluid passage in such a way that the two fluid chambers involuntarily move in phase and then one fluid chamber of the two fluid chambers may be connected to the fluid chamber 22a on the driven wheel side via the fluid passage 32 in such a manner as abovementioned. It is also noted that the present invention can be applied to any type of shock absorber such as an air type or oil type one, and a one-way type or two-way type one.

Figure 6:
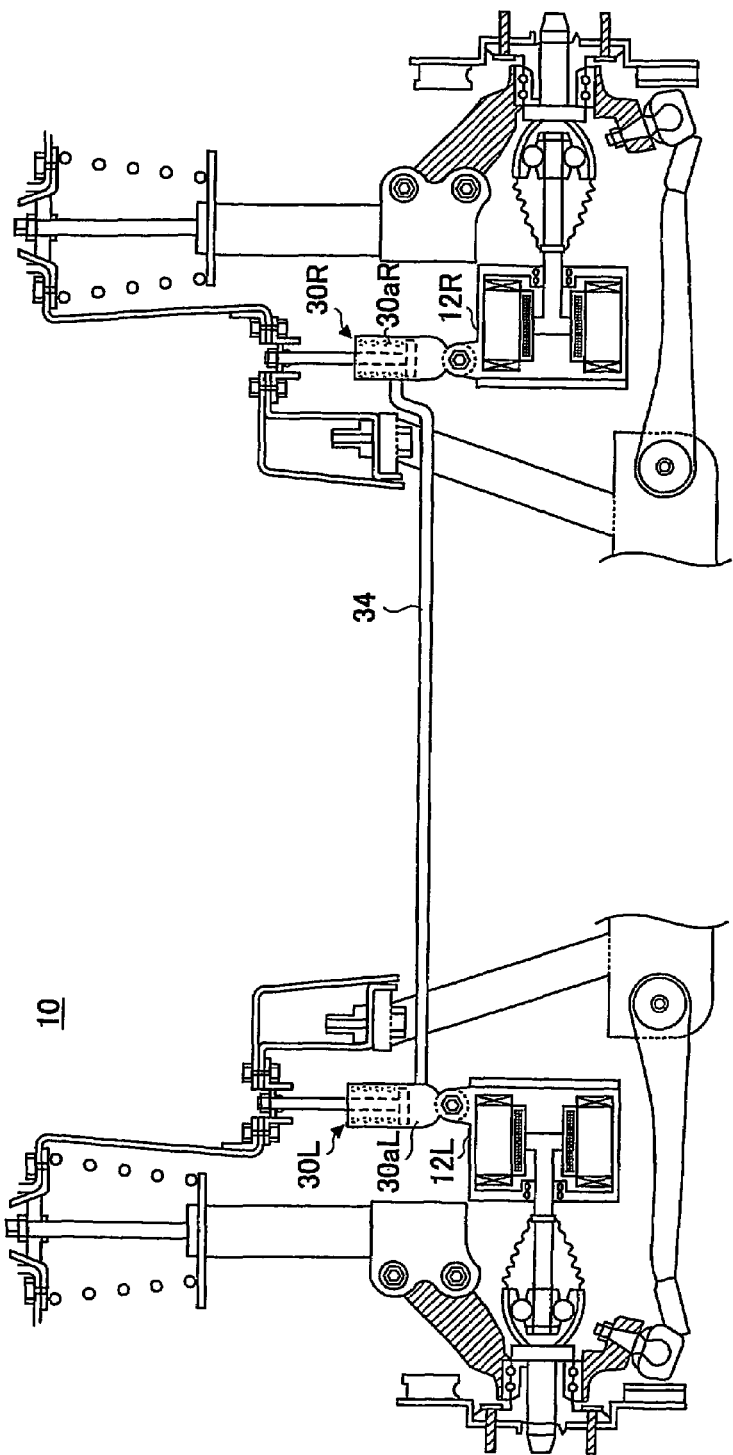
FIG. 6 is a schematic front view of a third embodiment of a suspension system according to the present invention.

Next, a third embodiment of a suspension system 10 according to the present invention is described with reference to FIG. 6. FIG. 6 is a schematic front view of a suspension system 10 according to the third embodiment. It is noted that the arrangement according to this embodiment may be applied to only front wheels or only rear wheels.

As shown in FIG. 6, the suspension system 10 according to the third embodiment differs from the suspension system 10 according to the first embodiment in that appropriate fluid chambers 30aL, 30aR of the shock absorbers of the suspensions 30L, 30R on both sides of the vehicle are connected to each other via a fluid passage 34. In this embodiment, the fluid passage 34 establishes fluid communication between the shock absorbers of the suspensions. 30L, 30R on both sides of the vehicle such that the two fluid chambers 30aL and 30aR displace (expand and contract) in phase. Thus, when the motor 12L for the driven wheel on the left side moves in an upward direction (the direction in which the volume of the fluid chamber 30aL decreases), the fluid in the fluid chamber 30aL of the suspension 30L on the left side is discharged into the fluid chamber 30aR of the suspension 30R on the right side via the fluid passage 34, whereby the motor 12R on the right side is urged in an upward direction (the direction in which a volume of the fluid chamber 30aR increases). In this way, since the motors 12L, 12R on both sides of the vehicle are permitted to move in up-and-down directions only in phase, the movements of the motors 12L, 12R in up-and-down directions are permitted only when the unsprung components on both sides of the vehicle vibrate in phase. As a result of this, it is possible to effectively prevent sprung masse from being urged in a roll direction due to reaction forces of the motors 12L, 12R.

It is noted that in the case of the two suspensions 30 being provided for each driven wheel as abovementioned, two pairs of two fluid chambers of the shock absorbers on both sides of the vehicle are connected via two fluid passages 34 in such a manner as abovementioned. Alternatively, two fluid chambers of the shock absorbers on each side may be connected to each other via a separate fluid passage in such that the two fluid chambers involuntarily move in phase and then one fluid chamber of the two fluid chambers on one side may be connected to one of the two fluid chambers on the other side via the fluid passage 34 in such a manner as abovementioned.

It is noted that the fluid passage 34 may establish fluid communication between the shock absorbers of the suspensions 30L, 30R on both sides of the vehicle such that the two fluid chambers 30aL and 30aR displace in opposite phases instead of in the same phase.

Next, a fourth embodiment of a suspension system 10 according to the present invention is described with reference to FIGS. 7 and 8.

Figure 7:
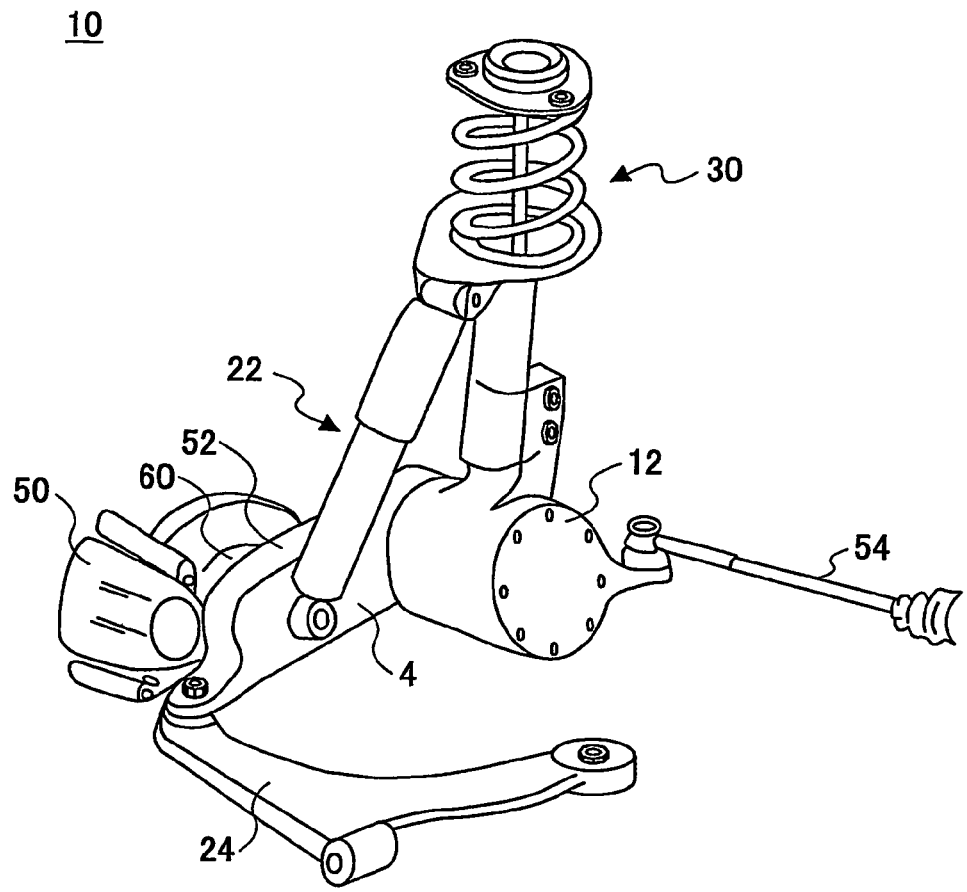
FIG. 7 is a schematic perspective view of a fourth embodiment of a suspension system according to the present invention.

FIG. 7 is a schematic perspective view of the suspension system 10 according to this embodiment. The suspension system 10 according to this embodiment has a motor 12 for driving a wheel. Every driven wheel is provided with the motor 12 and a braking system (e.g., a brake shoe 50, etc.) shown in part. A steering system (e.g., a tie rod 54) is provided for steering the wheel. Explanation is made below for only one wheel, since there is substantially no difference in arrangement between the wheels. However, it is noted that the arrangement according to this embodiment may be applied to only front wheels or only rear wheels.

The motor 12 according to this embodiment is supported by the vehicle body via a suspension 30, which includes a shock absorber and a coil spring, such that the motor 12 can move in up-and-down directions with respect to the vehicle body, as shown in FIG. 7. To the motor 12 is connected a gear casing 52 which transfers power from the motor 12 to the wheel. A rotating shaft (output shaft) 13 of the motor 12 (see FIG. 8) is adapted to the gear casing 52.

To the gear casing 52 is connected a hub unit 60. The hub unit 60 supports the wheel shaft by way of a bearing (not shown) incorporated therein. The wheel shaft of the driven wheel is supported within the gear casing 52 by way of a bearing (not shown). The gear casing 52 has a driving mechanism such as a driving chain and a driving belt which is wound around the wheel shaft and the rotating shaft 13. In this way, the rotating torque generated by the motor 12 can be transferred to the wheel shaft of the driven wheel via the driving mechanism.

Figure 8:
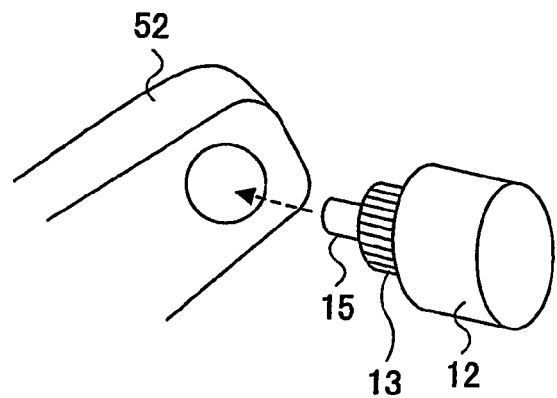
FIG. 8 is a diagram for schematically illustrating the connection structure between the motor 12 and the gear casing 52 of FIG. 7.

A part 15 of the rotating shaft 13 of the motor 12, which corresponds to a portion with smaller radius in the illustrated embodiment, is supported rotatably by a bearing (not shown) incorporated in the gear casing 52, as shown in FIG. 8. This bearing of the gear casing 52 permits rotation of the rotating shaft 13 while carrying axial and radial loads between the gear casing 52 and the rotating shaft 13. To the gear casing 52 is attached one end of a lower arm 24. The other end of the lower arm 24 is pivotally mounted to a suspension member (the vehicle body) by way of a bushing and the like. With this arrangement, the gear casing 52 is permitted to rotate around the rotating shaft 13 of the motor 12 while transferring power from the motor 12 to the wheel shaft. Correspondingly, the hub unit 60 is also permitted to rotate around the rotating shaft 13 of the motor 12 together with the gear casing 52.

Between the gear casing 52 and the motor 12 is provided a suspension 22. The suspension 22 illustrated in FIG. 7 includes a shock absorber and a coil spring incorporated therein. The upper end of the suspension 22 is coupled to a shell member (a lower spring seat for the coil spring) of the suspension 30 for the motor 12. The upper end of the suspension 22 may be coupled to other portions that move together with the motor 12.

The lower end of the suspension 22 is connected to the gear casing 52 (in this case, an inner surface of the gear casing 52). With this arrangement, the hub unit 60 including a tire, a wheel, a brake, etc., that is connected to the gear casing 52 is supported via the suspension 22 such that the hub unit 60 can move mainly in up-and-down directions with respect to the motor 12. Preferably, the connection point of the lower end of the suspension 22 to the gear casing 52 has an adequate distance from the rotational center (corresponding to the rotating shaft 13 of the motor 12) of the gear casing 52 in order to efficiently dampen the vibrations of the hub unit 60 in up-and-down directions.

It is noted that the present invention should not be limited by the aforementioned suspending way for the hub unit 60. Any suspending ways is applicable as long as the hub unit 60 including a tire, a wheel, a brake, etc., is elastically supported such that the hub unit 60 can move mainly in up-and-down directions with respect to the motor 12. For example, the suspension 22 may be arranged between the hub unit 60 and the motor 12 or any portion that moves together with the motor 12.

Figure 9A:
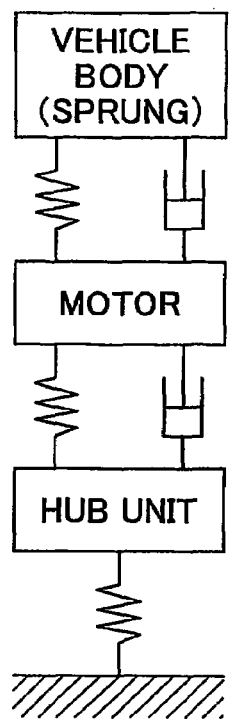
FIG. 9A is a diagram for illustrating a spring-mass model of the suspension system 10 of FIG. 7 according to the present invention.
Figure 9B:
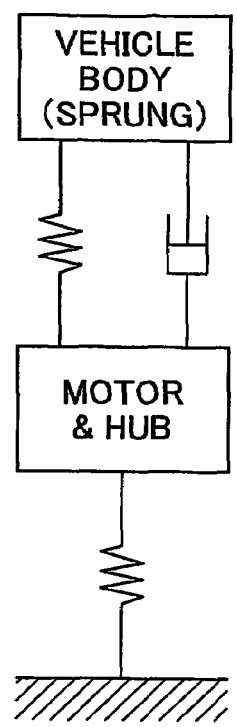
FIG. 9B is a diagram for illustrating a traditional spring-mass model for comparison purposes.
Figure 10:
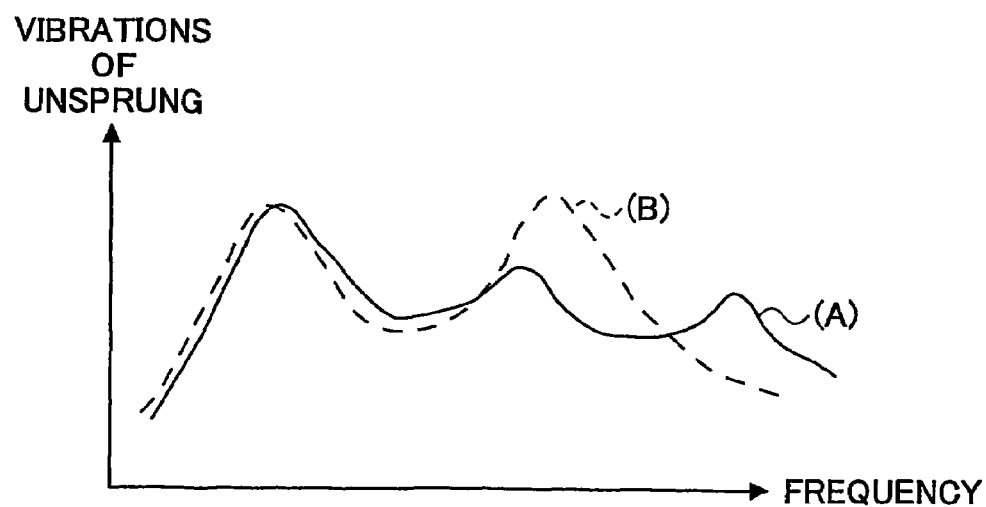
FIG. 10 is a graph showing performances of the spring-mass models illustrated in FIGS. 9A-9B.

FIG. 9A shows a spring-mass model of the suspension system 10 according to this embodiment. FIG. 9B shows a spring-mass model of the suspension system 10 for comparison purposes, where the motor 12 is rigidly coupled to the vehicle body. FIG. 10 shows performance curves (acceleration in up-and-down directions versus frequency) of the respective spring-mass models in FIGS. 3A-3B (a solid line for FIG. 3A and a broken line for FIG. 3B).

According to the present embodiment, as is apparent from the foregoing or FIGS. 3A-3B, the motor 12 and the hub unit 60 are connected to the vehicle body in series via respective spring elements and respective damper elements. Although this configuration defines two resonance points of an unsprung mass, a road holding characteristic (a ride comfort characteristic) at the higher resonance point is significantly improved with respect to the configuration shown in FIG. 9B, as shown in FIG. 10. Further, since the motor 12 and the hub unit 60 are suspended independently by the respective suspensions 22, 30, it is possible to tune suspension characteristics for the motor 12 and the hub unit 60 independently.

Figure 11:
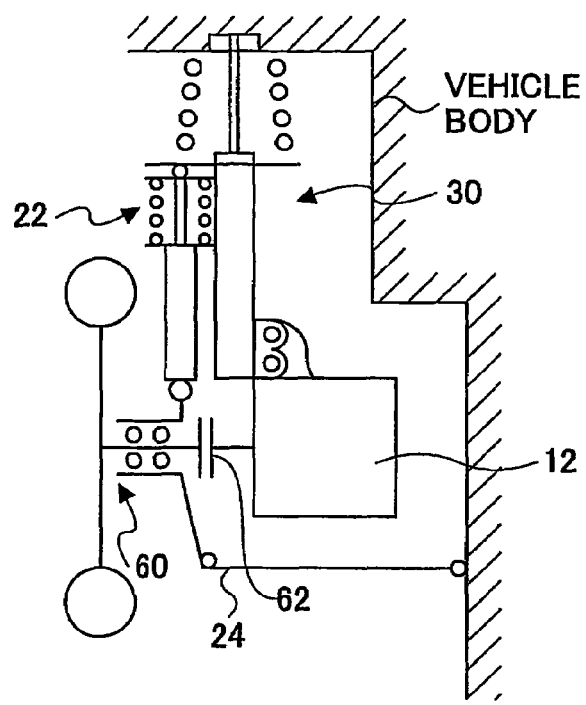
FIG. 11 is a schematic front view of a fifth embodiment of a suspension system according to the present invention.

Next, a fifth embodiment of a suspension system 10 according to the present invention is described with reference to FIG. 11. FIG. 11 is a schematic front view of the suspension system 10 according to fifth embodiment. Explanation is made below for only one wheel, since there is substantially no difference in arrangement between the wheels. However, it is noted that the arrangement according to this embodiment may be applied to only front wheels or only rear wheels.

The suspension system 10 according to this embodiment is embodied by applying the present invention to a known strut type suspension system. Specifically, a suspension 22 is disposed between a hub unit 60 and a motor 12, the same as the fourth embodiment. Similarly, the upper end of the suspension 22 is coupled to a shell member (a lower spring seat for the coil spring) of the suspension 30 for the motor 12. Similarly, the upper end of the suspension 22 may be coupled to other portions that move together with the motor 12, instead of the shell member. The lower end of the suspension 22 is coupled to a knuckle arm of the hub unit 60. In this arrangement, the hub unit 60 including a tire, a wheel, a brake, etc., is supported such that it can move mainly in up-and-down directions with respect to the motor 12.

The motor 12 is supported by a suspension 30 such that it can move mainly in up-and-down directions with respect to the vehicle body. A rotating shaft (output shaft) 13 of the motor 12 (see FIG. 8) and a wheel shaft of the driven wheel are interconnected via a flexible coupling 62. The flexible coupling 62 transfers power from the motor 12 to the wheel shaft while permitting relative movement between the motor 12 and the wheel shaft.

Correspondingly, according to this embodiment, since the hub unit 60 (including a tire, a wheel, a brake, etc.) is elastically supported such that it can move mainly in up-and-down directions with respect to the motor 12, and the motor 12 is elastically supported such that it can move mainly in up-and-down directions with respect to the vehicle body, a road holding characteristic is improved with respect to a configuration in which the hub unit 60 is rigidly connected to the motor 12.

Figure 12:
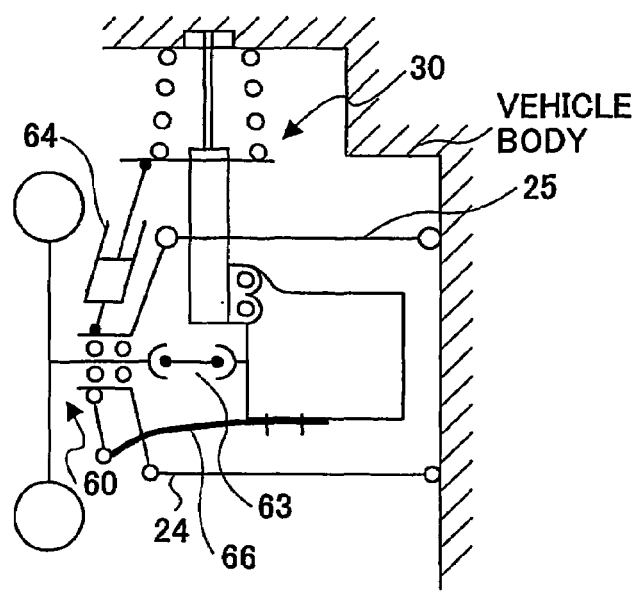
FIG. 12 is a schematic front view of a sixth embodiment of a suspension system according to the present invention.

Next, a sixth embodiment of a suspension system 10 according to the present invention is described with reference to FIG. 12. FIG. 12 is a schematic front view of the suspension system 10 according to sixth embodiment. Explanation is made below for only one wheel, since there is substantially no difference in arrangement between the wheels. However, it is noted that the arrangement according to this embodiment may be applied to only front wheels or only rear wheels.

The suspension system 10 according to this embodiment applies the present invention to a known double wishbone type suspension. Specifically, to a hub unit 60 is coupled a lower arm 24 and an upper arm 25 via ball joints or the like. The other ends of the lower arm 24 and the upper arm 25 are pivotally mounted to the vehicle body via bushings or the like.

Between the hub unit 60 and the motor 12 are provided a shock absorber 64 and a plate spring 66. One end of the shock absorber 64 is coupled to a shell member (a lower spring seat for the coil spring) of the suspension 30 and the other end is coupled to a knuckle arm of the hub unit 60. In this arrangement, the hub unit 60 including a tire, a wheel, a brake, etc., is supported by the shock absorber 64 and the plate spring 66 such that it can move mainly in up-and-down directions with respect to the motor 12.

A rotating shaft (output shaft) 13 of the motor 12 and a wheel shaft of the driven wheel are interconnected via a drive shaft 63 including a constant velocity joint. The drive shaft 63 transfers power from the motor 12 to the wheel shaft while permitting relative movement between the motor 12 and the wheel shaft.

Similarly, according to this embodiment, since the hub unit 60 (including a tire, a wheel, a brake, etc.) is elastically supported such that it can move mainly in up-and-down directions with respect to the motor 12, and the motor 12 is elastically supported such that it can move mainly in up-and-down directions with respect to the vehicle body, a road holding characteristic is improved with respect to a configuration in which the hub unit 60 is rigidly connected to the motor 12.

It is noted that the shock absorber 64 may be omitted if the plate spring 66 is a leaf spring (a laminated spring) that has a required damper characteristic. This arrangement can simplify means for supporting the hub unit 60 so that it can move mainly in up-and-down directions with respect to the motor 12.

The present invention is disclosed with reference to the preferred embodiments. However, it should be understood that the present invention is not limited to the above-described embodiments, and variations and modifications may be made without departing from the scope of the present invention.

For example, in the aforementioned fourth and fifth embodiments, the suspension 22 for the hub unit 60 and/or the suspension 30 for the motor 12 may be constituted by a leaf spring instead of the spring and the shock absorber. Further, the shock absorber may be any type of shock absorber such as a air type or oil type one, and a one-way type or two-way type one.

Further, in the aforementioned fifth embodiment, the rotating shaft 13 of the motor 12 and the wheel shaft of the driven wheel may be interconnected via a constant velocity joint. Similarly, in the aforementioned sixth embodiment, the rotating shaft 13 of the motor 12 and the wheel shaft of the driven wheel may be interconnected via a flexible coupling.

The invention claimed is:

1. A suspension system for a vehicle, comprising:
a motor that is disposed between a vehicle body and a knuckle for driving a wheel;
a first suspension that is provided between the wheel and the vehicle body for elastically supporting the wheel of the vehicle with respect to the vehicle body;
a second suspension that is provided between the motor and the vehicle body for elastically supporting the motor and providing independent movement of the motor with respect to the vehicle body; and
a power transferring mechanism that is provided between a rotating shaft of the motor and a wheel shaft of the wheel for transferring power from the motor to the wheel while permitting relative movement of the motor with respect to the wheel,
wherein the second suspension includes a spring element and a damper element.

2. A suspension system for a vehicle, comprising:
a motor for driving a wheel of the vehicle;
a first suspension for supporting the wheel of the vehicle with respect to a vehicle body;
a second suspension for elastically supporting the motor with respect to the vehicle body; and
a power transferring mechanism for transferring power from the motor to the wheel while permitting relative movement of the motor with respect to the wheel,
wherein a damper element of the first suspension and a damper element of the second suspension are interconnected via a fluid passage.

3. A suspension system for a vehicle, comprising:
a motor for driving a wheel of the vehicle;
a first suspension for supporting the wheel of the vehicle with respect to a vehicle body;
a second suspension for elastically supporting the motor with respect to the vehicle body; and
a power transferring mechanism for transferring power from the motor to the wheel while permitting relative movement of the motor with respect to the wheel,
wherein damper elements of second suspensions on both sides of the vehicle are interconnected via a fluid passage.

4. A suspension system for a vehicle, comprising:
a motor that is disposed between a vehicle body and a knuckle for driving a wheel;
a first suspension that is provided between the motor and the vehicle body for supporting the motor with respect to the vehicle body such that the motor can move in up-and-down directions with respect to the vehicle body;
a second suspension that is provided between the wheel and the motor for supporting the wheel with respect to the motor such that the wheel can move in up-and-down directions with respect to the motor; and
a power transferring mechanism that is provided between a rotating shaft of the motor and a wheel shaft of the wheel for transferring power from the motor to the wheel while permitting relative movement of the motor with respect to the wheel.

5. The suspension system as claimed in claim 4, wherein the first suspension includes a spring element and a damper element and the second suspension includes another spring element and another damper element.

6. The suspension system as claimed in claim 4, wherein the first suspension includes a plate spring.

7. A suspension system for a vehicle, comprising:
a motor that is disposed between a vehicle body and a knuckle for driving a wheel;
a first suspension that is provided between the wheel and the vehicle body for elastically supporting the wheel of the vehicle with respect to the vehicle body;
a second suspension that is provided between the motor and the vehicle body for elastically supporting the motor and providing travel of the motor with respect to the vehicle body; and
a power transferring mechanism that is provided between a rotating shaft of the motor and a wheel shaft of the wheel for transferring power from the motor to the wheel while permitting relative movement of the motor with respect to the wheel.

* * * * *